(12) United States Patent
Grohoski et al.

(10) Patent No.: US 7,543,132 B1
(45) Date of Patent: Jun. 2, 2009

(54) OPTIMIZING HARDWARE TLB RELOAD PERFORMANCE IN A HIGHLY-THREADED PROCESSOR WITH MULTIPLE PAGE SIZES

(75) Inventors: Greg F. Grohoski, Bee Cave, TX (US); Ashley Saulsbury, Los Gatos, CA (US); Paul J. Jordan, Austin, TX (US); Manish Shah, Austin, TX (US); Rabin A. Sugumar, Sunnyvale, CA (US); Mark Debbage, Santa Clara, CA (US); Venkatesh Iyengar, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 164 days.

(21) Appl. No.: 10/880,985

(22) Filed: Jun. 30, 2004

(51) Int. Cl.
*G06F 12/10* (2006.01)
(52) U.S. Cl. .................. 711/204; 711/150; 711/151; 711/158; 711/202; 711/203; 711/205; 711/206; 711/216
(58) Field of Classification Search .......... None
See application file for complete search history.

(56) References Cited

U.S. PATENT DOCUMENTS

| | | | |
|---|---|---|---|
| 5,446,854 A | 8/1995 | Khalidi et al. ............. 395/401 |
| 5,465,337 A | 11/1995 | Kong ........................ 395/417 |
| 5,479,627 A | 12/1995 | Khalidi et al. ............. 395/415 |
| 5,526,504 A * | 6/1996 | Hsu et al. ................... 711/207 |
| 5,712,791 A | 1/1998 | Lauterbach ................ 364/489 |
| 5,717,885 A * | 2/1998 | Kumar et al. .............. 711/207 |
| 5,742,792 A | 4/1998 | Yanai et al. |
| 5,761,707 A | 6/1998 | Aiken et al. |
| 5,802,341 A * | 9/1998 | Kline et al. ................ 711/209 |
| 5,802,561 A | 9/1998 | Fava et al. |
| 5,828,860 A | 10/1998 | Miyaoku et al. |
| 5,842,225 A | 11/1998 | Kohn ........................ 711/202 |
| 5,862,450 A | 1/1999 | Mandal et al. ............. 455/3.1 |
| 5,899,994 A | 5/1999 | Mohamed et al. ......... 707/100 |
| 5,933,627 A | 8/1999 | Parady ...................... 395/569 |
| 5,956,756 A * | 9/1999 | Khalidi et al. ............. 711/207 |
| 6,006,312 A | 12/1999 | Kohn et al. ................ 711/210 |

(Continued)

OTHER PUBLICATIONS

The Cache Memory Book, second edition, pub. 1998) by Jim Handy, pp. 14-17 and 208-209.*

(Continued)

*Primary Examiner*—Hyung S Sough
*Assistant Examiner*—Kaushikkumar Patel
(74) *Attorney, Agent, or Firm*—Osha • Liang LLP

(57) ABSTRACT

A method and apparatus for improved performance for reloading translation look-aside buffers in multithreading, multi-core processors. TSB prediction is accomplished by hashing a plurality of data parameters and generating an index that is provided as an input to a predictor array to predict the TSB page size. In one embodiment of the invention, the predictor array comprises two-bit saturating up-down counters that are used to enhance the accuracy of the TSB prediction. The saturating up-down counters are configured to avoid making rapid changes in the TSB prediction upon detection of an error. Multiple misses occur before the prediction output is changed. The page size specified by the predictor index is searched first. Using the technique described herein, errors are minimized because the counter leads to the correct result at least half the time.

20 Claims, 9 Drawing Sheets

U.S. PATENT DOCUMENTS

| | | | |
|---|---|---|---|
| 6,016,542 A | 1/2000 | Gottlieb et al. | 712/225 |
| 6,044,446 A | 3/2000 | Joy et al. | 711/203 |
| 6,092,154 A | 7/2000 | Curtis et al. | 711/137 |
| 6,098,169 A | 8/2000 | Ranganathan | 712/227 |
| 6,138,209 A * | 10/2000 | Krolak et al. | 711/128 |
| 6,141,692 A | 10/2000 | Loewenstein et al. | 709/234 |
| 6,247,121 B1 | 6/2001 | Akkary et al. | 712/239 |
| 6,272,520 B1 | 8/2001 | Sharangpani et al. | 709/108 |
| 6,295,600 B1 | 9/2001 | Parady | 712/228 |
| 6,308,279 B1 | 10/2001 | Toll et al. | 713/323 |
| 6,314,563 B1 | 11/2001 | Agesen et al. | 717/9 |
| 6,374,349 B1 * | 4/2002 | McFarling | 712/239 |
| 6,408,368 B1 | 6/2002 | Parady | 711/159 |
| 6,535,905 B1 | 3/2003 | Kalafatis et al. | 709/108 |
| 6,574,725 B1 * | 6/2003 | Kranich et al. | 712/31 |
| 6,578,137 B2 | 6/2003 | Parady | 712/228 |
| 6,581,140 B1 * | 6/2003 | Sullivan et al. | 711/128 |
| 6,609,193 B1 | 8/2003 | Douglas et al. | 712/219 |
| 6,625,654 B1 | 9/2003 | Wolrich et al. | 709/230 |
| 6,633,984 B2 | 10/2003 | Susser et al. | 713/201 |
| 6,647,458 B1 | 11/2003 | Glynn | |
| 6,671,707 B1 | 12/2003 | Hudson et al. | 707/206 |
| 6,700,410 B2 | 3/2004 | Ebergen | 326/93 |
| 6,700,825 B1 | 3/2004 | Ebergen | 365/221 |
| 2001/0047468 A1 | 11/2001 | Parady | 712/228 |
| 2002/0052926 A1 | 5/2002 | Bush et al. | 709/217 |
| 2002/0078122 A1 * | 6/2002 | Joy et al. | 709/102 |
| 2002/0129309 A1 | 9/2002 | Floyd et al. | 714/724 |
| 2002/0199070 A1 | 12/2002 | Chaudhry et al. | |
| 2003/0088610 A1 | 5/2003 | Kohn et al. | 709/107 |
| 2003/0088713 A1 | 5/2003 | Mandal et al. | |
| 2003/0097518 A1 | 5/2003 | Kohn et al. | 711/5 |
| 2003/0105756 A1 | 6/2003 | Daynes | 707/8 |
| 2003/0105907 A1 | 6/2003 | Kohn et al. | 710/305 |
| 2003/0120825 A1 | 6/2003 | Avvari et al. | 709/316 |
| 2003/0149861 A1 | 8/2003 | Becker | 712/214 |
| 2003/0163645 A1 | 8/2003 | Tremblay et al. | 711/137 |
| 2003/0191927 A1 | 10/2003 | Joy et al. | 712/228 |
| 2003/0212874 A1 | 11/2003 | Alderson | 711/170 |
| 2004/0002974 A1 | 1/2004 | Kravitz et al. | 707/8 |
| 2004/0003208 A1 | 1/2004 | Damron | 712/225 |
| 2004/0003211 A1 | 1/2004 | Damron | 712/228 |
| 2004/0006633 A1 | 1/2004 | Chandra et al. | 709/231 |
| 2004/0034853 A1 | 2/2004 | Gibbons et al. | 717/174 |
| 2004/0073906 A1 | 4/2004 | Chamdani et al. | 718/102 |
| 2004/0117600 A1 | 6/2004 | Bodas et al. | |
| 2004/0123028 A1 | 6/2004 | Kanai et al. | |
| 2005/0027961 A1 * | 2/2005 | Zhang | 711/207 |

OTHER PUBLICATIONS

R. Heald et al., "A Third-Generation SPARC V9 64-b Microprocessor," IEEE JSSC, Nov. 2000, pp. 1526-1538.

"Igniting a Computing Revolution! Throughput Computing," Sun Microsystems Brochure.

"Introduction to Throughput Computing," Sun Microsystems whitepaper, Feb. 2003.

D. Wendell et al., "A 4 MB On-Chip L2 Cache for a 90nm 1.6GHz 64 bit Microprocessor," IEEE JSSC (Feb. 2004).

G. Konstadinidis et al., "Implementation of a Third-Generation 1.1GHz 64b Microprocessor," 2002 IEEE Journal of Solid-State Circuits, vol. 37, No. 11, pp. 1461-1469 (Nov. 2002).

K. Krewell, "Sun Weaves Multithreaded Future," Microprocessor Report, Reed Electronics Group (Apr. 14, 2003).

"UltraSPARC® IV Processor," User's Manual Supplement, Sun Microsystems, version 1.0 (Apr. 2004).

"UltraSPARC® IV Processor," Datasheet, Sun Microsystems.

"The UltraSPARC® IIIi Processor" Architecture Overview, Technical Whitepaper, Sun Microsystems, version 1.2 (Apr. 2004).

"UltraSPARC® IV Processor," Architecture Overview, Technical Whitepaper, Sun Microsystems, Version 1.0 (Feb. 2004).

R. Ronen, "VLSI Architecture Design Course," Lecture #10, Multithreaded Architectures (dated May 2003).

K. Mai et al., "Smart Memories: A Modular Reconfigurable Architecture," Stanford University Proceedings of the 27$^{th}$ ISCA (Jun. 2000).

L. Hammond et al., "The Stanford Hydra CMP," IEEE Micro, pp. 71-84, (Mar.-Apr. 2000).

L. Hammond et al., "Considerations in the Design of Hydra: A Multiprocessor-on-a-Chip Microarchitecture," Technical Report No. CSL-TR-98-749, pp. 1-10 (Feb. 1998).

K. Privitt, et al., "Threading: Connecting the Pieces, System Architecture, Application, OS and Tools," Intel Developer Forum (Feb. 17-19, 2004).

Watanabe, K. et al. (2001) "Exploiting Java Instruction/Thread Level Parallelism with Horizontal Multithreading," IEEE, pp. 122-129.

Wikipedia, "Cache," Version as of Dec. 30, 2007. Accessed Jan. 4, 2008, http://en.wikipedia.org/wiki/Cache.

Koopman, Philip, "Cache Organization," lecture material, Carnegie Mellon University, Sep. 2, 1998, http://www.ece.cmu.edu/?ece548/handouts/04cachor.pdf.

* cited by examiner

-- Prior Art --

-- Prior Art --

-- Prior Art --

OPTIMIZING HARDWARE TLB RELOAD PERFORMANCE IN A HIGHLY-THREADED PROCESSOR WITH MULTIPLE PAGE SIZES

BACKGROUND OF THE INVENTION

1. Field of the Invention

The present invention relates generally to the field of processor or computer design and operation. In one aspect, the present invention relates to memory operations in a multithreaded processor and, in particular, to an improved method and apparatus for improving translation look-aside buffer reload performance.

2. Description of the Related Art

Computer systems are constructed of many components, typically including one or more processors that are connected for access to one or more memory devices (such as RAM) and secondary storage devices (such as hard disks and optical discs). For example, FIG. 1 is a diagram illustrating a computer system 10 with multiple memories. Generally, a processor 1 connects to a system bus 12. Also connected to the system bus 12 is a memory (e.g., 14). During processor operation, CPU 2 processes instructions and performs calculations. Data for the CPU operation is stored in and retrieved from memory using a memory controller 8 and cache memory, which holds recently or frequently used data or instructions for expedited retrieval by the CPU 2. Specifically, a first level (L1) cache 4 connects to the CPU 2, followed by a second level (L2) cache 6 connected to the L1 cache 4. The CPU 2 transfers information to the L2 cache 6 via the L1 cache 4. Such computer systems may be used in a variety of applications, including as a server 10 that is connected in a distributed network, such as Internet 9, enabling server 10 to communicate with clients A-X, 3, 5, 7.

Because processor clock frequency is increasing more quickly than memory speeds, there is an ever increasing gap between processor speed and memory access speed. In fact, memory speeds have only been doubling every six years—one-third the rate of microprocessors. In many commercial computing applications, this speed gap results in a large percentage of time elapsing during pipeline stalling and idling, rather than in productive execution, due to cache misses and latency in accessing external caches or external memory following the cache misses. Stalling and idling are most detrimental, due to frequent cache misses, in database handling operations such as OLTP, DSS, data mining, financial forecasting, mechanical and electronic computer-aided design (MCAD/ECAD), web servers, data servers, and the like. Thus, although a processor may execute at high speed, much time is wasted while idly awaiting data.

One technique for reducing stalling and idling is hardware multithreading to achieve processor execution during otherwise idle cycles. FIGS. 2a and 2b show two timing diagrams illustrating an execution flow 22 in a single-thread processor and an execution flow 24 in a vertical multithread processor. Processing applications, such as database applications and network computing applications, spend a significant portion of execution time stalled awaiting memory servicing. This is illustrated in FIG. 2a, which depicts a highly schematic timing diagram showing execution flow 22 of a single-thread processor executing a database application. The areas within the execution flow 22 labeled as "C" correspond to periods of execution in which the single-thread processor core issues instructions. The areas within the execution flow 22 labeled as "M" correspond to time periods in which the single-thread processor core is stalled waiting for data or instructions from memory or an external cache. A typical single-thread processor executing a typical database application executes instructions about 25% of the time with the remaining 75% of the time elapsed in a stalled condition. The 25% utilization rate exemplifies the inefficient usage of resources by a single-thread processor.

FIG. 2b is a highly schematic timing diagram showing execution flow 24 of similar database operations by a multi-thread processor. Applications, such as database applications, have a large amount of inherent parallelism due to the heavy throughput orientation of database applications and the common database functionality of processing several independent transactions at one time. The basic concept of exploiting multithread functionality involves using processor resources efficiently when a thread is stalled by executing other threads while the stalled thread remains stalled. The execution flow 24 depicts a first thread 25, a second thread 26, a third thread 27 and a fourth thread 28, all of which are labeled to show the execution (C) and stalled or memory (M) phases. As one thread stalls, for example first thread 25, another thread, such as second thread 26, switches into execution on the otherwise unused or idle pipeline. There may also be idle times (not shown) when all threads are stalled. Overall processor utilization is significantly improved by multithreading. The illustrative technique of multithreading employs replication of architected registers for each thread and is called "vertical multithreading."

Vertical multithreading is advantageous in processing applications in which frequent cache misses result in heavy clock penalties. When cache misses cause a first thread to stall, vertical multithreading permits a second thread to execute when the processor would otherwise remain idle. The second thread thus takes over execution of the pipeline. A context switch from the first thread to the second thread involves saving the useful states of the first thread and assigning new states to the second thread. When the first thread restarts after stalling, the saved states are returned and the first thread proceeds in execution. Vertical multithreading imposes costs on a processor in resources used for saving and restoring thread states, and may involve replication of some processor resources, for example replication of architected registers, for each thread. In addition, vertical multithreading complicates any ordering and coherency requirements for memory operations when multiple threads and/or multiple processors are vying for access to any shared memory resources.

Modern processor architectures commonly support multiple virtual memory page sizes in order to efficiently map both large and small memory regions into processes' address spaces. The mapping of virtual to physical memory is accomplished via software-programmed tables in physical memory referred to as TSBs (Translation Storage Buffers). These tables are cached in hardware structures referred to as TLBs (Translation Look-aside Buffers). Each processor access that requires an address translation (typically each instruction fetch and data access) looks up the virtual address of the access in the TLB. If the address tag hits in the TLB, the TLB returns the physical address where the item resides. If the address misses in the TLB, the TLB contents need to be updated. Operating system software can update the TLB. While flexible, this approach requires a trap to a software TLB reload handler whose latency can be quite large. Another alternative commonly employed in higher performance implementations is to reload the TLB contents via hardware. This is less flexible since the hardware has to understand the TSB format. However, it has the advantage of minimizing the TLB reload latency.

In a highly threaded processor, the TLB miss rate increases, and the cumulative effect of TLB misses for both instruction and data references can significantly reduce performance. Threads vie for limited space in the TLBs, increasing TLB miss rates. Furthermore, if only software reload is available, many threads spend time executing the TLB reload handler which takes execution resources away from doing more useful work.

In a TLB architecture which supports multiple page sizes, and allows complete flexibility for any virtual address to be statically mapped to any page size, there is an additional performance consideration. The TLB reload handler must search the virtual-to-physical mappings for each page size. In general it does not know, given a virtual address, which page size applies to the address. Thus, the TLB reload process, either in hardware or software, needs to predict the page size to minimize the time spent searching for the proper address translation. This is especially important in a high performance implementation, such as that required for a highly-threaded processor with hardware tablewalk.

Accordingly, improved memory operations for multi-threading and/or multi-core processors and operating methods are needed that are economical in resources and avoid costly overhead which reduces processor performance. In particular, there is a need for an improved method and apparatus for improving translation look-aside buffer reload performance in multithreading and/or multi-core processors. Further limitations and disadvantages of conventional systems will become apparent to one of skill in the art after reviewing the remainder of the present application with reference to the drawings and detailed description which follow.

SUMMARY OF THE INVENTION

The method and apparatus of the present invention provides improved performance for reloading translation look-aside buffers in multithreading, multi-core processors. In the present invention, TSB prediction is accomplished by hashing a plurality of data parameters, including the virtual address, and generating an index that is provided as an input to a predictor array to predict the TSB page size. In one embodiment of the invention, the predictor array comprises two-bit saturating up-down counters that are used to enhance the accuracy of the TSB prediction. The saturating up-down counters are configured to avoid making rapid changes in the TSB prediction upon detection of an error. Specifically, the output of the prediction array is not changed upon detection of a first miss. Instead, multiple misses must occur before the prediction output is changed. In particular, in the present invention, the high-order bit of the two-bit counter is used for the TSB table size prediction. If the prediction based on the high-order bit is erroneous, the lower bit is incremented or decremented to register the fact that there was a misprediction. For each TSB miss request, a hash function is performed to generate a predictor index that is used as an input to a predictor array comprising the two-bit saturating up-down counters. The page size specified by the predictor index is searched first. If the prediction is correct, the counter value is either incremented (if originally "1x") or decremented (if originally "0x"), to reinforce the correct prediction. Otherwise, the counter value is decremented (if originally "1x") or incremented (if originally "0x") to adjust the counter for the misprediction. Each two-bit counter saturates at a value of either "00" or "11." Using the technique described herein, errors are minimized because the counter will lead to the correct result at least half the time rather than creating the possibility that each prediction will lead to the wrong value.

In practical implementations of the method and apparatus described herein, significant performance increases are achieved for reloading translation look-aside buffers in multithreaded, multi-core processors.

DETAILED DESCRIPTION

As explained herein, when multiple thread and/or processor operations are using a shared memory system, the memory operations must be coordinated so that each thread can access the memory in an ordered and coherent way with minimal delay or latency. For purposes of providing an exemplary and not limiting description, it will be useful to describe the various aspects and embodiments of the invention herein in the context of memory operations for an on-chip cache memory system that is constructed with CMOS SRAM memory cells. However, the present invention is not limited to CMOS-based processes and may be used in connection with other categories of memory products, including without limitation, DRAM, ROM, flash, PLA and the like, whether integrated within a VLSI system, cache or non-cache, or a stand alone memory device.

Figure 1:
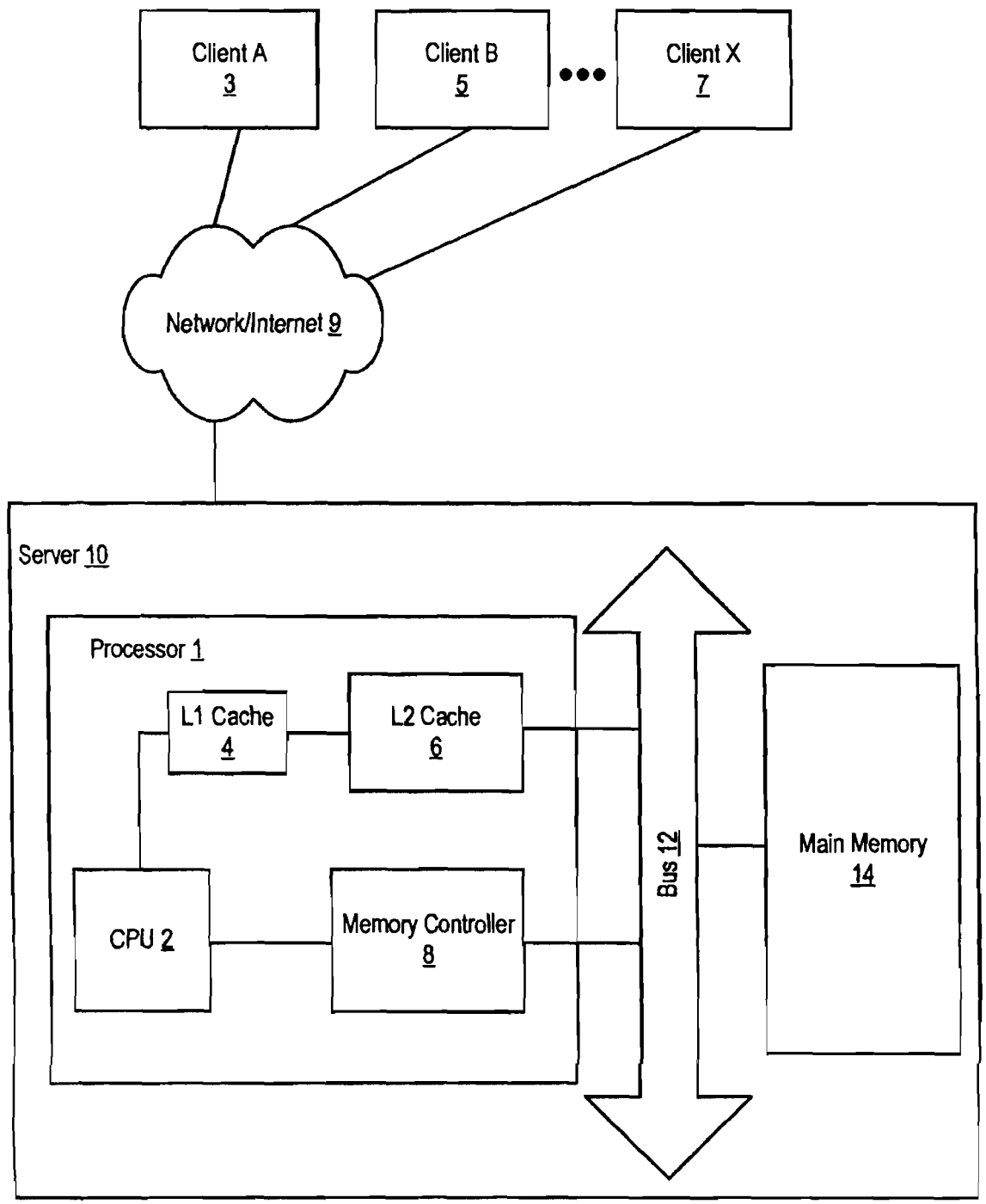
FIG. 1 illustrates a computer system in a communication network.
Figure 2A:
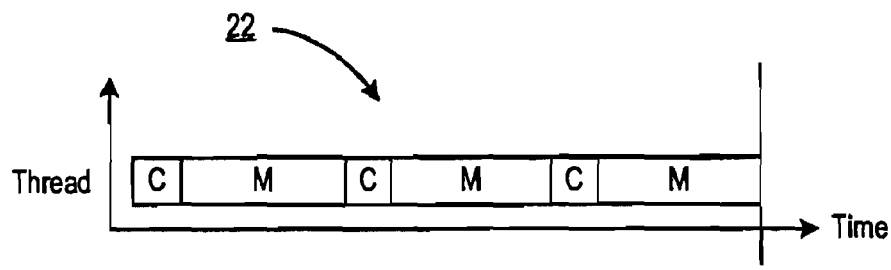
FIGS. 2a and 2b are timing diagrams respectively illustrating execution flows of a single-thread processor and a vertical multithread processor.
Figure 2B:
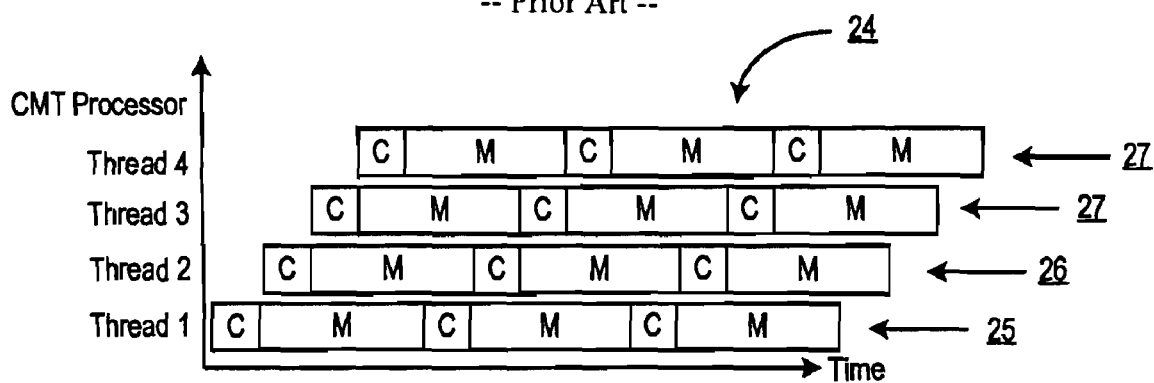
Figure 3:
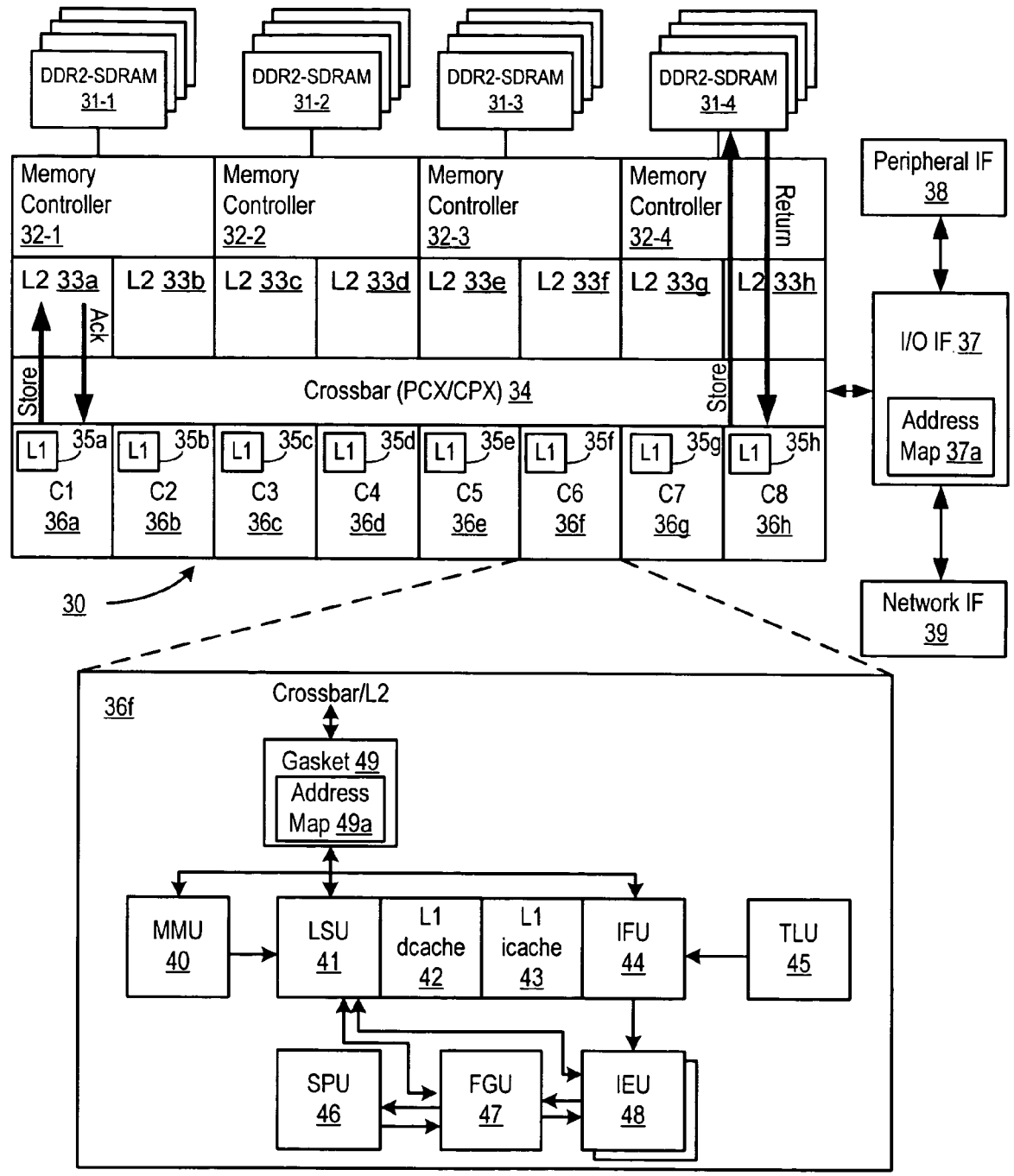
FIG. 3 illustrates a simplified schematic diagram of a processor chip having multiple processor cores for executing multiple threads, wherein each core contains a first level cache and the multiple cores share a second level cache in accordance with an exemplary embodiment of the invention.

A selected embodiment of the present invention is shown in FIG. 3, which depicts a simplified schematic diagram of a processor chip 30 having multiple processor cores for processing multiple threads. In the illustrated embodiment, processor chip 30 includes a plurality of processor cores 36a-h, which are also designated "C1" though "C8." Each of cores 36 is coupled to an L2 cache 33 via a crossbar 34. L2 cache 33 is coupled to one or more memory controller(s) 32, which are coupled in turn to one or more banks of system memory 31. Additionally, crossbar 34 couples cores 36 to input/output (I/O) interface 37, which is in turn coupled to a peripheral interface 38 and a network interface 39.

Cores 36 may be configured to execute instructions and to process data according to a particular instruction set architecture (ISA). In one embodiment, cores 36 may be configured to implement the SPARC V9 ISA, although in other embodiments, it is contemplated that any desired ISA may be employed, such as x86, PowerPC, or MIPS, for example. In a selected embodiment, a highly suitable example of a processor design for the processor core is a SPARC processor core, UltraSPARC processor core or other processor core based on the SPARC V9 architecture. Those of ordinary skill in the art also understand the present invention is not limited to any particular manufacturer's microprocessor design. The processor core may be found in many forms including, for example, the 64-bit SPARC RISC microprocessor from Sun Microsystems, or any 32-bit or 64-bit microprocessor manufactured by Motorola, Intel, AMD, or IBM. However, any other suitable single or multiple microprocessors, microcontrollers, or microcomputers may be utilized. In the illustrated embodiment, each of cores 36 may be configured to operate independently of the others, such that all cores 36 may execute in parallel. In some embodiments, each of cores 36 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core may also be referred to as a multithreaded (MT) core. In an example embodiment shown in FIG. 3, each processor core includes eight threads. Thus, a single processor chip 30 with eight cores (C1 through C8) will have sixty-four threads in this configuration. However, it should be appreciated that the invention is not limited to eight processor cores, and that more or fewer cores can be included. In other embodiments, it is contemplated that the core may process different numbers of threads.

Each processor core 36a-36h is in communication with crossbar 34 which manages data flow between cores 36 and the shared L2 cache 33 and may be optimized for processor traffic where it is desirable to obtain extremely low latency. The crossbar 34 may be configured to concurrently accommodate a large number of independent accesses that are processed on each clock cycle, and enables communication data requests from cores 36 to L2 cache 33, as well as data responses from L2 cache 33 to cores 36. In one embodiment, crossbar 34 may include logic (such as multiplexers or a switch fabric, for example) that allows any core 36 to access any bank of L2 cache 33, and that conversely allows data to be returned from any L2 bank to any core. Crossbar 34 may also include logic to queue data requests and/or responses, such that requests and responses may not block other activity while waiting for service. Additionally, in one embodiment crossbar 34 may be configured to arbitrate conflicts that may occur when multiple cores attempt to access a single bank of L2 cache 33 or vice versa. Thus, the multiple processor cores 36a-36h share a second level (L2) cache 33 through a crossbar bus 34 (processor to cache and cache to processor, a.k.a. PCX and CPX).

In connection with the example described herein, each processor core (e.g., 36f) shares an L2 cache memory 33 to speed memory access and to overcome the delays imposed by accessing remote memory subsystems (e.g., 31). Cache memory comprises one or more levels of dedicated high-speed memory holding recently accessed data, designed to speed up subsequent access to the same data. When data is read from main memory (e.g., 31), a copy is also saved in the L2 cache 33, and an L2 tag array stores an index to the associated main memory. The L2 cache 33 then monitors subsequent requests for data to see if the information needed has already been stored in the L2 cache. If the data had indeed been stored in the cache (i.e., a "hit"), the data is delivered immediately to the processor core 36 and the attempt to fetch the information from main memory 31 is aborted (or not started). If, on the other hand, the data had not been previously stored in the L2 cache (i.e., a "miss"), the data is fetched from main memory 31 and a copy of the data and its address is stored in the L2 cache 33 for future access.

Figure 4:
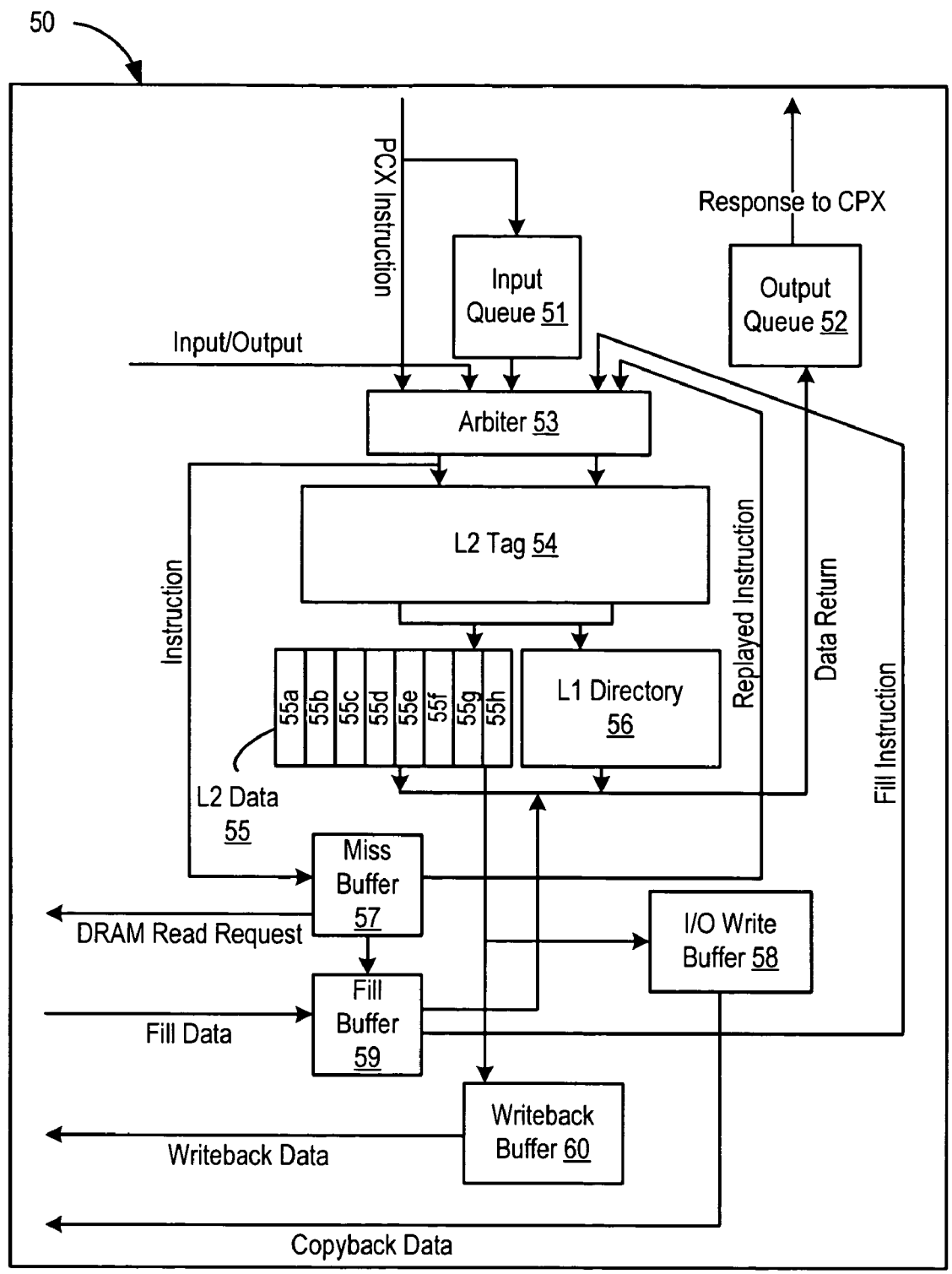
FIG. 4 depicts the organization of a second level cache memory in accordance with an illustrative embodiment of the invention.

The shared L2 cache 33 accepts requests from the processor cores 36 on the processor to cache crossbar (PCX) 34 and responds on the cache to processor crossbar (CPX) 34. As described herein, the L2 cache 33 is also responsible for maintaining coherency across all caches on the chip by keeping a copy of all L1 tags in a directory structure. FIG. 4 depicts the organization of an L2 cache memory 50 in accordance with an illustrative embodiment of the invention. The L2 cache 50 includes eight banks that are shared by the processor cores. It should be appreciated that, by sharing L2 cache banks, concurrent access may be made to the multiple banks, thereby defining a high bandwidth memory system. The invention is not limited to eight L2 cache banks or to any particular size, but the illustrated embodiment should be sufficient to provide enough bandwidth from the L2 cache to keep all of the cores busy most of the time. The L2 cache 50 includes an L2 data array 55 and tag array 54 configured to cache instructions and data for use by cores. In the illustrated embodiment, L2 cache 50 may be organized into eight separately addressable banks that may each be independently accessed, such that in the absence of conflicts, each bank may concurrently return data to any of the processor cores 36a-h. In some embodiments, each individual bank may be implemented using set-associative or direct-mapped techniques. For example, in one embodiment, L2 cache 50 may be a 4 megabyte (MB) cache, where each 512 kilobyte (KB) bank (e.g., 55a) is 16-way set associative with a 64 byte (64B) cache line size, although other cache sizes and geometries are possible and contemplated. L2 cache 50 may be implemented in some embodiments as a writeback cache in which written (dirty) data may not be written to system memory until a corresponding cache line is evicted.

In some embodiments, L2 cache 50 may implement an input queue 51 for holding requests arriving from the crossbar, and an output queue 52 for buffering results to be sent to the crossbar. Additionally, in some embodiments, L2 cache 50 may implement a fill buffer 59 configured to store fill data arriving from memory controller 32, a writeback buffer 60 configured to store dirty evicted data to be written to memory, an I/O write buffer 58 configured to store incoming data from the crossbar in the event of multi-cycle memory write operations, and/or a miss buffer 57 configured to store L2 cache accesses that cannot be processed as simple cache hits (e.g., L2 cache misses, cache accesses matching older misses, accesses such as atomic operations that may require multiple cache accesses, etc.). L2 cache 50 may variously be implemented as single-ported or multi-ported (i.e., capable of processing multiple concurrent read and/or write accesses). In either case, L2 cache 50 may implement arbitration logic 53 to prioritize cache access among various cache read and write requestors. While the L2 cache 50 may include a tag array 54 for holding the memory addresses of the L2 cache data array 55, the L2 cache 50 may also advantageously include an additional tag array 54 for holding the memory addresses of each L1 cache data array in each processor core. The additional tag array 54 is referred to as the L1 directory because it maintains a copy of the L1 tags for coherency management and also ensures that the same line is not resident in both the instruction cache and data cache (across all cores). Thus, the L1 directory 56 is split into an instruction cache directory and a data cache directory. On certain data accesses, the L1 directory 56 is CAMed to determine whether the data is resident in L1 caches. The result of this CAM operation is a set of match bits which is used to create an invalidation vector to be sent back to the processor cores.

Referring again to FIG. 3, the L2 cache 33 is in communication with main memory controller 32 to provide access to the external memory 31 or main memory (not shown). Memory controller 32 may be configured to manage the transfer of data between L2 cache 33 and system memory, for example in response to L2 fill requests and data evictions. In some embodiments, multiple instances of memory controller 32 may be implemented, with each instance configured to control a respective bank of system memory. Memory controller 32 may be configured to interface to any suitable type of system memory, such as Double Data Rate or Double Data Rate 2 Synchronous Dynamic Random Access Memory (DDR/DDR2 SDRAM), or Rambus DRAM (RDRAM), for example. In some embodiments, memory controller 32 may be configured to support interfacing to multiple different types of system memory.

In the illustrated embodiment, processor chip 30 may be configured to receive data from sources other than system memory 31. I/O interface 37 may be configured to provide a central interface for such sources to exchange data with cores 36 and/or L2 cache 33 via crossbar 34. In some embodiments, I/O interface 37 may be configured to coordinate Direct Memory Access (DMA) transfers of data between network interface 39 or peripheral interface 38 and system memory 31 via memory controller 32. In addition to coordinating access between crossbar 34 and other interface logic, in one embodiment, I/O interface 37 may be configured to couple processor chip 30 to external boot and/or service devices. For example, initialization and startup of processor chip 30 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor chip 30, before the boot process proceeds to load data from a disk or network device. Additionally, in some embodiments, such an external device may be configured to place processor chip 30 in a debug, diagnostic, or other type of service mode upon request.

Peripheral interface 38 may be configured to coordinate data transfer between processor chip 30 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 38 may implement one or more instances of an interface such as Peripheral Component Interface Express (PCI-Express), although it is contemplated that any suitable interface standard or combination of standards may be employed. For example, in some embodiments, peripheral interface 38 may be configured to implement a version of Universal Serial Bus (USB) protocol or IEEE 1394 (Firewire) protocol in addition to or instead of PCI-Express.

Network interface 39 may be configured to coordinate data transfer between processor chip 30 and one or more devices (e.g., other computer systems) coupled to processor chip 30 via a network. In one embodiment, network interface 39 may be configured to perform the data processing necessary to implement an Ethernet (IEEE 802.3) networking standard such as Gigabit Ethernet or 10-gigabit Ethernet, for example, although it is contemplated that any suitable networking standard may be implemented. In some embodiments, network interface 39 may be configured to implement multiple discrete network interface ports.

The multiprocessor chip 30 described herein and exemplified in FIG. 3 may be configured for multithreaded execution. More specifically, in one embodiment, each of cores 36 may be configured to perform fine-grained multithreading, in which each core may select instructions to execute from among a pool of instructions corresponding to multiple threads, such that instructions from different threads may be scheduled to execute adjacently. For example, in a pipelined embodiment of core 36f employing fine-grained multithreading, instructions from different threads may occupy adjacent pipeline stages, such that instructions from several threads may be in various stages of execution during a given core processing cycle.

Figure 5:
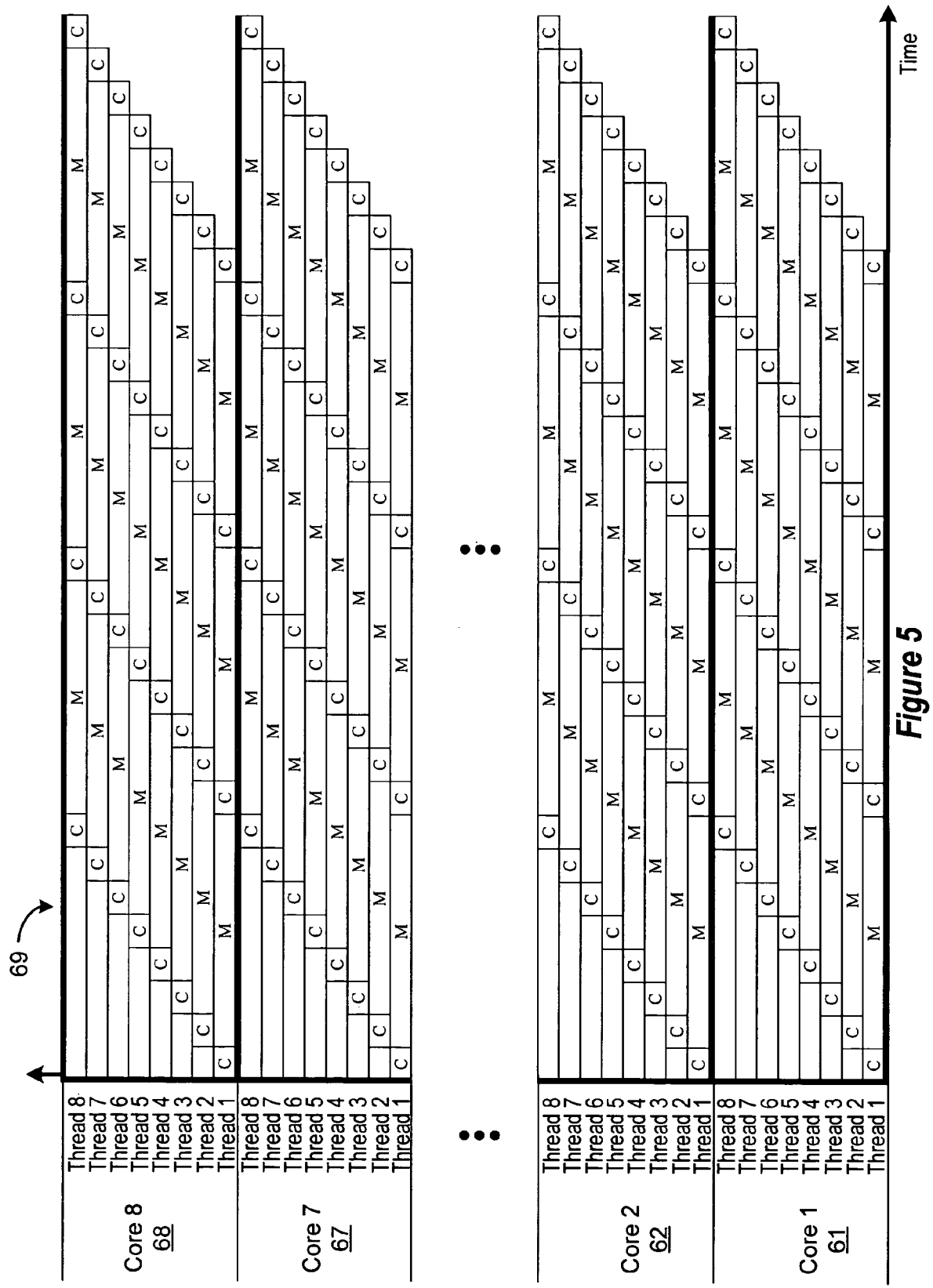
FIG. 5 is a timing diagram illustrating an execution flow of a vertical and horizontal multithread processor in accordance with an illustrative embodiment of the invention.

FIG. 5 is a timing diagram illustrating execution flow of a vertical and horizontal multithread multiprocessor embodiment of the invention using a high throughput architecture with eight processor cores 61-68, each having eight threads. In FIG. 5, the execution flow for a given vertical threaded processor 61 (e.g., Core 1) includes execution of multiple threads (e.g., Threads 1-8). For each thread in each core, the areas labeled "C" show periods of execution and the areas labeled "M" show time periods in which a memory access is underway, which would otherwise idle or stall the processor core. Thus, in the first processor core (Core 1), Thread 1 uses the processor core (during the times labeled as "C") and then is active in memory (during the times labeled as "M"). While Thread 1 in a given core is active in memory, Thread 2 in that same core accesses the processor core and so on for each of Threads 3-8. Vertical multithread processing is implemented by maintaining a separate processing state for each executing thread on a processing core. With only one of the threads being active at one time, each vertical multithreaded processor core switches execution to another thread during a memory access, such as on a cache miss. In this way, efficient instruction execution proceeds as one thread stalls and, in response to the stall, another thread switches into execution on the otherwise unused or idle pipeline. In essence, the pipeline overlaps the execution of multiple threads to maximize processor core pipeline utilization. As will be appreciated, the multiplicity of thread operations from a vertically threaded processor (e.g., core 1) will require a memory system that can process multiple references or threads simultaneously. For example, multiple memory operations must be coordinated so that each thread can access the L2 cache 33 or system memory in an ordered and coherent way with minimal contention, delay or latency.

In accordance with a selected embodiment of the present invention, the processor cores can be replicated a number of times in the same area. This is also illustrated in FIG. 3, which illustrates a collection of eight processor cores on a single integrated circuit die. Likewise, FIG. 5 illustrates the timing diagram for an execution flow of a horizontal threaded processor with multiple, vertical threaded processor cores, using a technique called chip multiprocessing. By using multiple vertically threaded processors—each of which (e.g., Core 1) is vertically threaded—a processor system is formed with both vertical and horizontal threading, augmenting executing efficiency and decreasing latency in a multiplicative fashion. The execution flow 69 illustrated in FIG. 5 for a vertical and horizontal threaded processor includes execution of threads 1-8 on a first processor core (Core 1), execution of threads 1-8 on a second processor core (Core 2), and so on with processor cores 3-8. Execution of threads 1-8 on the first processor core (Core 1) illustrates vertical threading. Similarly, execution of threads 1-8 on the second processor (Core 2) illustrates vertical threading. Where a single system or integrated circuit includes more than one processor core, the multiple processor cores executing multiple threads in parallel is a chip multi-threading (CMT) processor system. The combination of vertical multithreading and horizontal multithreading increases processor parallelism and performance, and attains an execution efficiency that exceeds the efficiency of a processor with only vertical multithreading. The combination of vertical multithreading and horizontal multithreading also advantageously reduces communication latency among local (on-chip) multi-processor tasks by eliminating much signaling on high-latency communication lines between integrated circuit chips. Horizontal multithreading further advantageously exploits processor speed and power improvements that inherently result from reduced circuit sizes in the evolution of silicon processing. However, with the use of vertically and horizontally threaded processors, the coordination requirements for the resulting multiplicity of thread operations from multiple processors (e.g., cores 1-8) will require a memory system that can coordinate multiple memory operations where, for example, each thread must access the L2 cache 33 or system memory in an ordered and coherent way with minimal contention, delay or latency.

In the illustrative embodiment depicted in FIG. 3, each core (e.g., 36*f*) may be configured to perform fine-grained horizontal multithreading operations. The depicted core 36*f* includes an instruction fetch unit (IFU) 44 that is coupled to a memory management unit (MMU) 40, a trap logic unit (TLU) 45, and at least one instruction execution unit (IEU) 48. Each of execution units 48 is coupled to both a floating point/graphics unit (FGU) 47 and a load store unit (LSU) 41. Each of the LSU units is also coupled to send data back to each of execution units 48 and FGU unit 47. The FGU 47 is coupled to a stream processing unit (SPU) 46. Additionally, LSU 41, IFU 51 and MMU 40 are coupled to a gasket or interface unit 49 for interface to the crossbar 34.

As illustrated, each threaded core (e.g. C6 36*f*) includes a first level (L1) cache (e.g., 35*f*) which includes a data cache (dcache) segment 42 an an instruction cache (icache) segment 43. In operation, the instruction fetch unit (IFU) 44 retrieves instructions for each thread and stores them in an instruction cache 43 and instruction buffers (not shown). IFU 44 then selects two instructions to execute among eight different threads, and provides the instructions to the decode unit which decodes one instruction each from two thread groups per cycle and supplies the pre-decoded instruction to the execution units 48. Each integer execution unit includes an arithmetic logic unit (ALU), shifter, and integer register files for processing and storing thread status information. Execution unit results are supplied via selection circuits to the processor core, the L1 data cache and the L2 cache. A single data cache 42 may also be provided in the LSU 58. For additional details concerning the design and operation of the processor core and its constituent resources, see co-pending U.S. patent application Ser. No. 10/880,488, entitled "Apparatus And Method For Fine-Grained Multithreading In A Multi-Pipelined Processor Core," filed Jun. 30, 2004, and assigned to Sun Microsystems, which is hereby incorporated by reference in its entirety.

As was discussed hereinabove, modern processor architectures commonly support multiple virtual memory page sizes in order to efficiently map both large and small memory regions into processes' address spaces. The mapping of virtual to physical memory is accomplished via software-programmed tables in physical memory referred to as translation storage buffers (TSBs). These tables are cached in hardware structures referred to as TLBs (Translation Look-aside Buffers). Each processor access that requires an address translation (typically each instruction fetch and data access) looks up the virtual address of the access in the TLB. If the address tag hits in the TLB, the TLB returns the physical address where the item resides, If the address misses in the TLB, the TLB contents need to be updated.

In one embodiment of the present invention, the multi-threaded, multi-core processor supports four page sizes ranging in size from 8 KB to 256 MB. In a TLB architecture which supports multiple page sizes, and allows complete flexibility for any virtual address to be statically mapped to any page size, the TLB reload handler must search the virtual-to-physical mappings for each page size. In general it does not know, given a virtual address, which page size applies to the address. Thus, the TLB reload process can predict the page size to minimize the time spent searching for the proper address translation.

In an embodiment of the present invention, a sequential search approach is employed for TLB reload. When a TLB miss occurs, hardware chooses a candidate page size by predicting the page size of the virtual address. It then searches the TSB for that page size. If a match is found, the matching entry is reloaded into the TLB. If no match is found, hardware continues predicting each remaining page size, until either a match is found, or no matching entry is found.

In the present invention, the TSB prediction is accomplished by hashing the virtual address and indexing into a table to predict the TSB page size. While various data parameters can be chosen for the hashing function depending on the table size and the virtual address architectural details, the 64 entries, of 2 bits each, shown below in Table 1, is used in an embodiment of the present invention. The particular parameters shown in Table 1 are components of the Sun Microsystems SPARC MMU architecture. Other MMU architectures, such as Power PC, x86, or MIPS, may have different virtual address parameters which could be used in a hash. The particular hash detailed in Table 1 below was shown via extensive simulation to provide near-optimal performance while having a small hardware cost.

TABLE 1

| cxt[12:0] = context of the request |
| pid[2:0] = partition ID of the request |
| va[47:28] = Virtual Address bits 47 to 28 of request |
| indx[5:0] = index into 64-entry prediction table |

| indx[5] | indx[4] | indx[3] | indx[2] | indx[1] | indx[0] |
|---------|---------|---------|---------|---------|---------|
| cxt[5]  | cxt[4]  | cxt[3]  | cxt[2]  | cxt[1]  | cxt[0]  |
| cxt[6]  | cxt[7]  | cxt[8]  | cxt[9]  | cxt[10] | cxt[11] |
| va[29]  | va[28]  | pid[2]  | pid[1]  | pid[0]  | cxt[12] |
| va[30]  | va[31]  | va[32]  | va[33]  | va[34]  | va[35]  |
| va[41]  | va[40]  | va[39]  | va[38]  | va[37]  | va[36]  |
| va[42]  | va[43]  | va[44]  | va[45]  | va[46]  | va[47]  |

Figure 6:
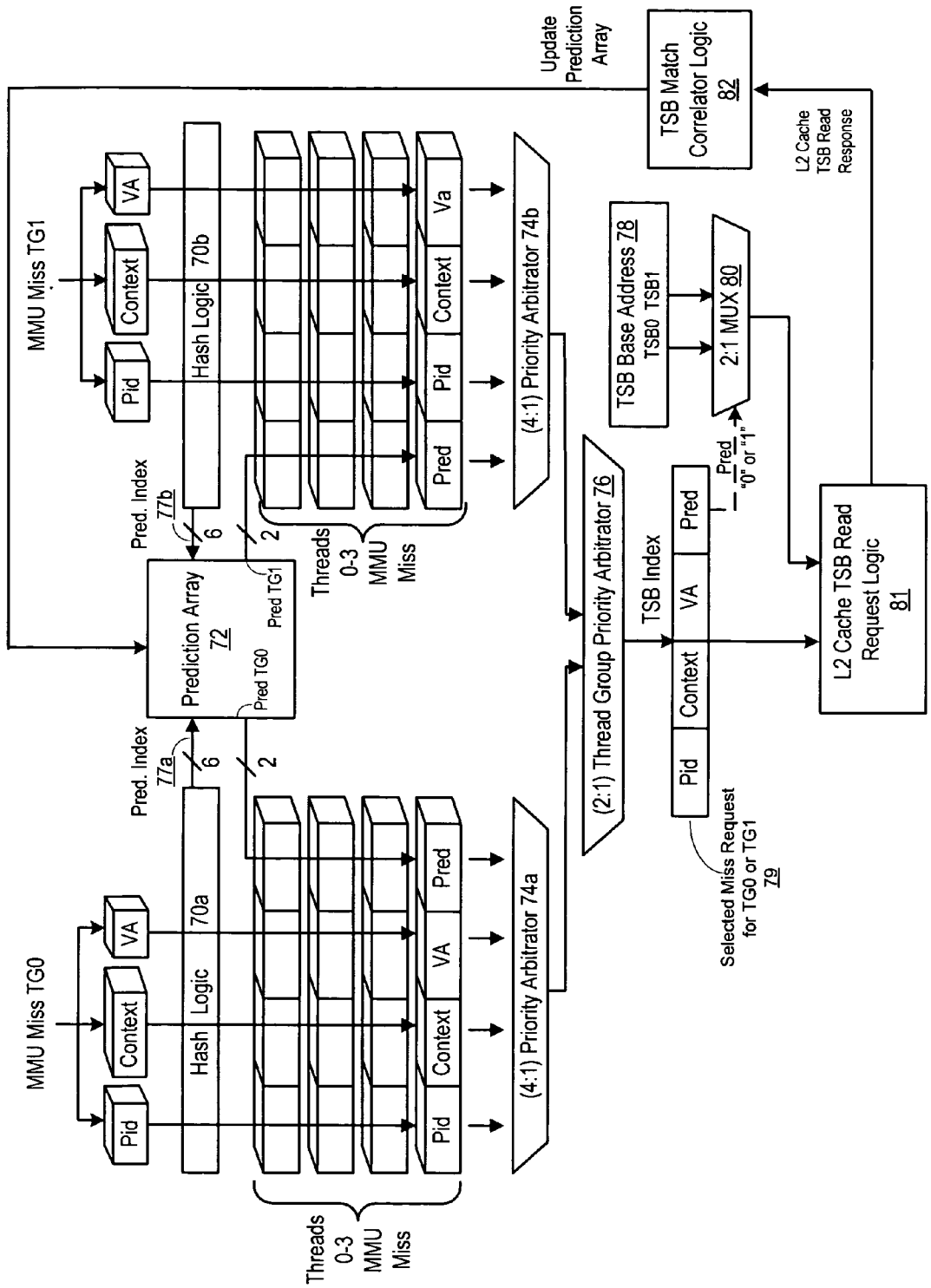
FIG. 6 is a flow diagram of the memory management unit miss-request datapath showing translation storage buffer predictor access.
Figure 7:
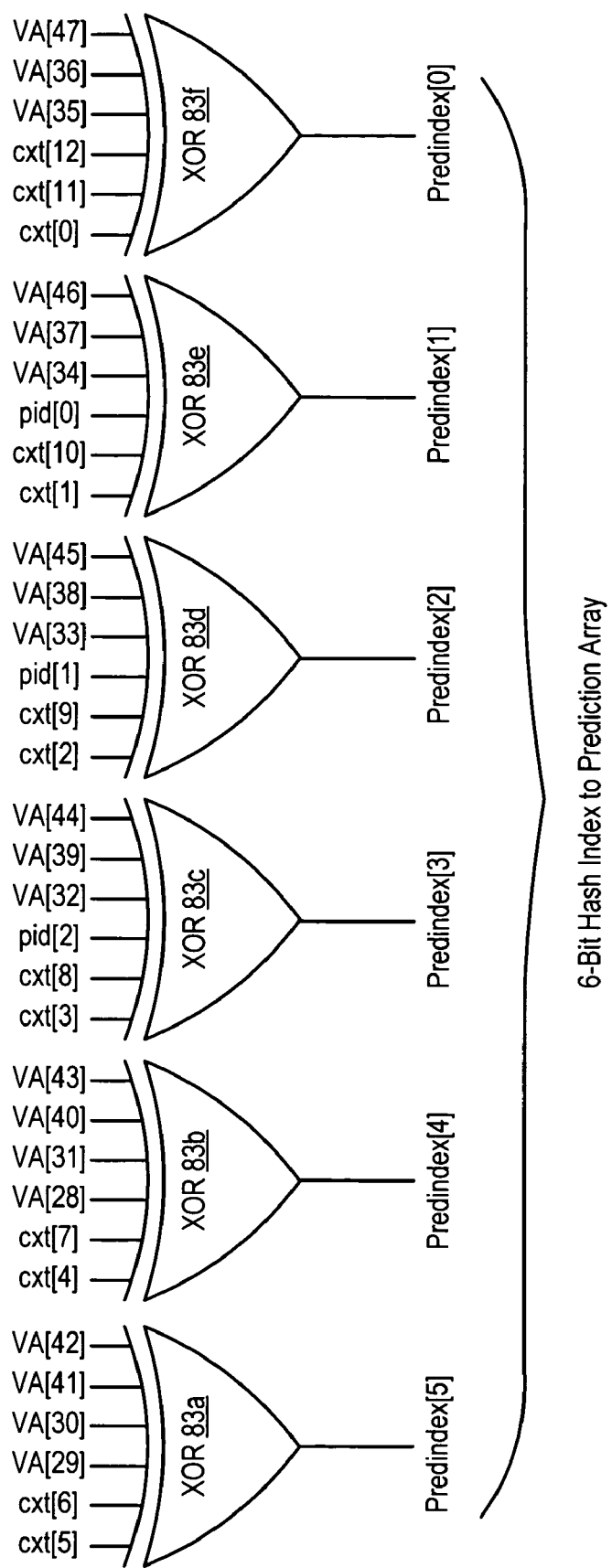
FIG. 7 is a diagram of hashing logic operable to generate a hash index for use by the translation storage buffer predictor array in accordance with the present invention.
Figure 8:
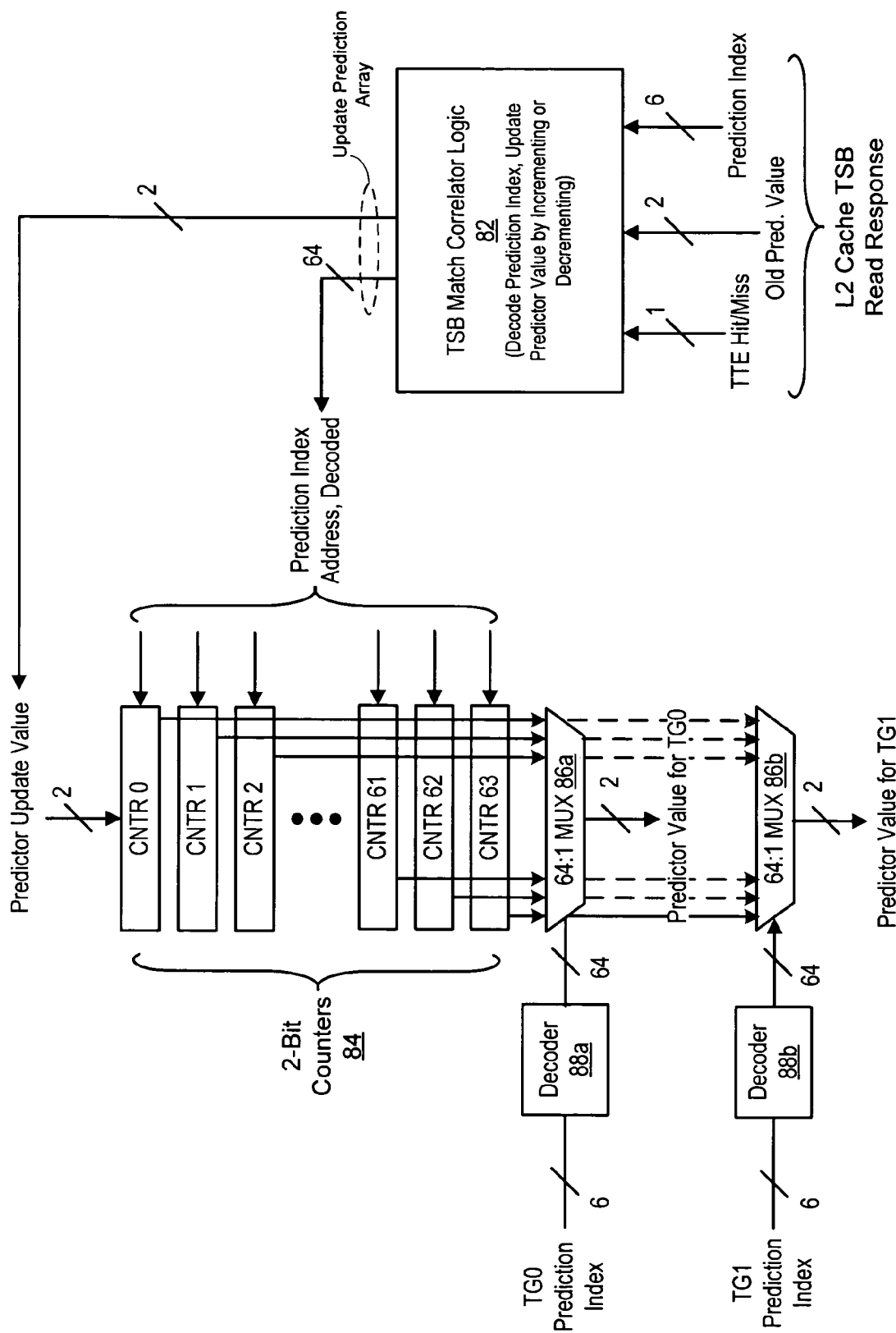
FIG. 8 is a simplified diagram of functional components of the translation storage buffer predictor array in accordance with the present invention.

The use of the above-referenced parameters to predict the TSB page size can be understood by referring to FIGS. 6-8. FIG. 6 is a flow diagram of the memory management unit (MMU) miss-request datapath showing translation storage buffer predictor access. Data paths are shown for two thread groups, thread group 0 (TG1) and thread group 1 (TG1). In the embodiment illustrated in FIG. 6, each of the aforementioned thread groups comprises MMU requests for four threads (0-3). For purposes of discussion, the data path and processing steps for TG0 will be discussed, although it will be understood that the processing steps apply to the MMU requests corresponding to TG1. Data corresponding to the partition identifier (Pid), the Context and the Virtual Address (VA) for each of the threads are provided as inputs to the hash logic modules 70*a* and 70*b*. The hash logic modules 70*a* and 70*b* comprise a plurality of exclusive OR (XOR) circuits that process the Pid, Context and VA data to generate a six-bit predictor index as discussed in greater detail below in connection with FIG. 7. The six-bit predictor index is provided to a predictor array 72, described in greater detail below in connection with FIGS. 8 and 9, that is operable to generate a two-bit predictor variable ("Pred") for each of the thread groups TG0 and TG1. The two-bit predictor variable, Pred, is combined with the Pid, Context and VA to complete the set of data parameters for the respective MMU miss requests for each of the thread groups. The data parameters for TG0 and TG1 are provided as inputs to priority arbitrators 74*a* and 74*b*, which are operable to select one of the MMU requests from each of the thread groups as an input to the thread group priority arbitrator 76 which selects an MMU request for TG0 or TG1 in accordance with a predetermined priority mechanism. The thread group priority arbitrator 76 generates an output, designated by reference numeral 79, comprising the parameters for Pid, Context, VA and Pred for the selected thread group (TG0 or TG1). These data parameters are provided to the L2 cache TSB read logic module 81 to generate a read request for the TSB in the predicted table. The read request also comprises a TSB base address that is generated by the TSB base address module 78 based on the value of the Pred variable provided to the multiplexer 80 and generated as an input to the L2 cache TSB read request logic 81. The TSB read request logic 81 generates an L2 cache read request that results in a response that is received by the TSB match correlator logic 82 and is used to update the prediction array 72 to improve the accuracy of the predictions, as describe in greater detail hereinbelow.

FIG. 7 is a diagram of hashing logic 70*a* and 70*b* operable to generate a hash index for use by the translation storage buffer predictor array in accordance with the present invention. The hash logic comprises six XOR gates 83*a-f*. Each of these XOR gates receives six of the input index parameters shown above in Table 1. The output of the 6-way XOR gate array is a 6 bit index (Predindex 0-5) that is used to select one of 64 counters in a two-bit counter array contained in the predictor array 72 via wires 77*a* and 77*b*.

FIG. 8 is a simplified diagram of functional components of the translation storage buffer predictor array in accordance with the present invention. The predictor array comprises a plurality of two-bit counters, CNTR 0-63, collectively designated by reference numeral 84. In one embodiment of the invention, the array of two-bit counters comprises 64 two-bit saturating up-down counters that are used to enhance the accuracy of the TSB prediction as discussed in greater detail hereinbelow. The output of each of the two-bit counters is provided as input to a multiplexer 86*a*, corresponding to TG0 and a multiplexer 86*b* corresponding to TG1. A six-bit prediction index for TG0 is provided as an input to the decoder 88*a*. This index is used by decoder 88*a* to cause multiplexer 86*a* to select the appropriate two-bit counter entry and to generate the corresponding two-bit TSB predictor value for TG0. Likewise, a six-bit prediction index for TG1 is provided as an input to the decoder 88*b*. This index is used by decoder 88*b* to cause multiplexer 86*b* to select the appropriate two-bit counter entry and to generate the corresponding two-bit TSB predictor value for TG1. One of the predictor value outputs of the multiplexers 86*a*, 86*b* is used to select a TSB for a table-walk procedure in response to a MMU miss request for TG0 or TG1. The TSB match correlator logic 82 receives input data based on the L2 cache TSB read response. The input data includes TTE hit/miss data indicating whether the TSB read request resulted in a hit or a miss, along with input data corresponding to the previous prediction index and the previous prediction value (Pred). The output of the TSB match correlator logic 82 comprises the 64 bit predictor index that is used to select the two-bit counter that needs to be updated and a two-bit predictor update value that updates the previous state of the selected two-bit counter. As will be discussed in greater detail hereinbelow in connection with FIG. 9, the two-bit saturating counter is updated to reinforce correct predictions and to change the predicted page size (based on the high-order bit) only after multiple missed predictions.

Figure 9:
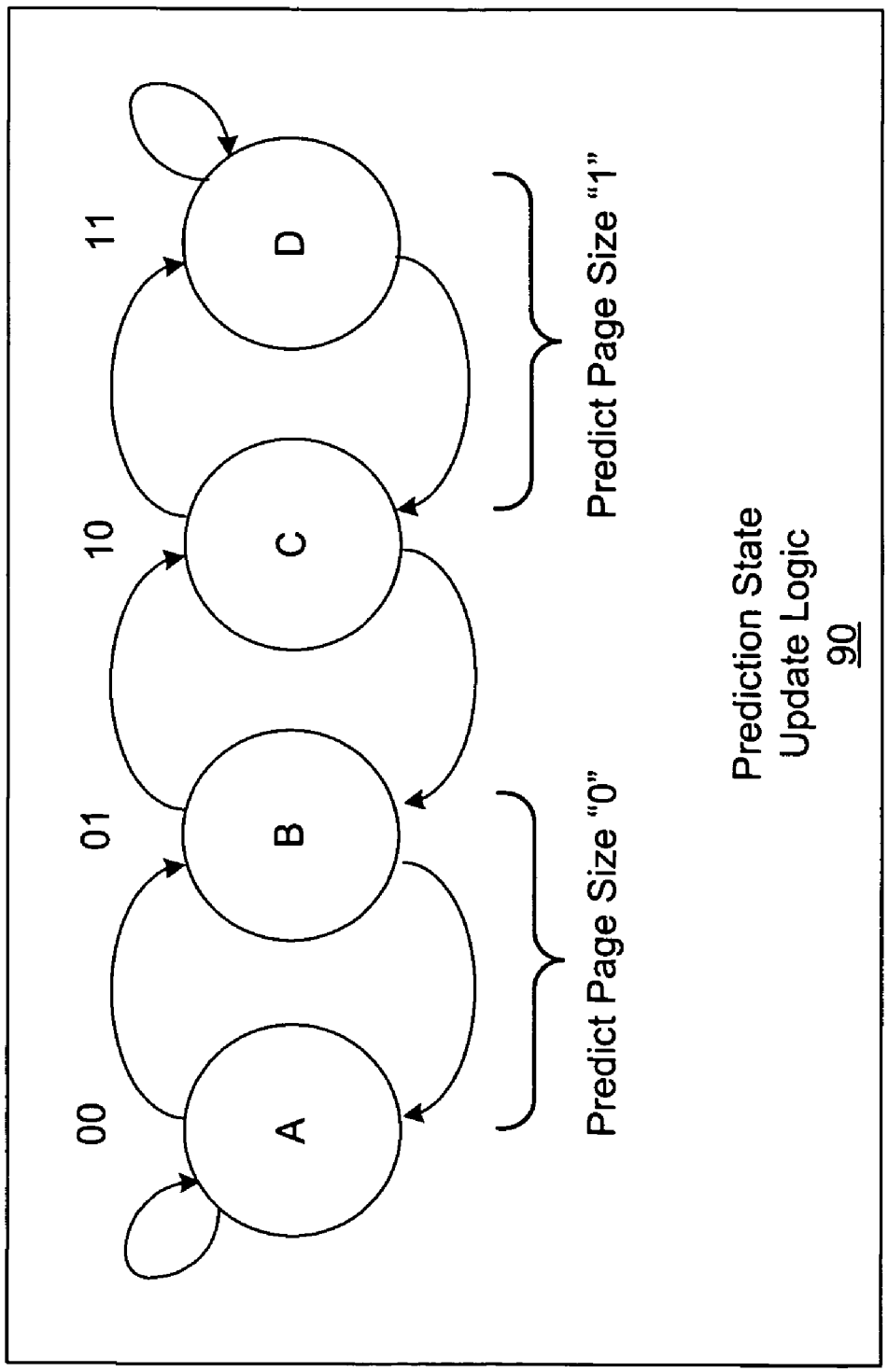
FIG. 9 is an illustration of the prediction state update logic operable to track changes in the transition states for the prediction of translation storage buffers in accordance with an embodiment of the present invention.

FIG. 9 is an illustration of the prediction state update logic 90 for the prediction of translation storage buffers in accordance with an embodiment of the present invention. As was discussed above, the counters implemented in one embodiment of the present comprise two-bit saturating counters. This type of counter is configured to avoid making rapid changes in the TSB prediction upon detection of an error. As will be understood by those of skill in the art, if the prediction table has a history of accurately identifying the proper TSB, there is a substantial likelihood that rapid changes in the prediction value will lead to additional misses rather than to improved accuracy. Therefore, in the present invention, the output of the prediction array is not changed upon detection of a first miss. Instead, in the present invention, multiple misses must occur before the prediction output is changed.

In the present invention, the high-order bit of the two-bit counter from the prediction array 72 is used for the TSB table size prediction. If the prediction based on the high-order bit is erroneous, then the lower order bit is incremented or decremented to register the fact that there was a missed prediction. For each TSB miss, the hash function is performed, and the corresponding table is consulted. The page size specified by the predictor entry is searched first. If the prediction was correct, the counter value is either incremented (if originally "1x") or decremented (if originally "0x"), to reinforce the correct prediction. Otherwise, the table entry is decremented (if originally "1x") or incremented (if originally "0x") to adjust the counter for the misprediction. Each 2-bit counter saturates at a value of either "00" or "11."

This principle can be understood by referring to the state diagrams illustrated in FIG. 9. If the high-order digit of the two-bit counter results in state "A" with the prediction of a table size "0," and the prediction is correct, then the lower order bit remains unchanged, (i.e., "0<u>0</u>") and the predictor array will be updated accordingly to indicate that the previous prediction was correct. If, however, the initial prediction based on the "0" value of the high-order digit is incorrect, then the state transitions to state "B" and the lower order digit of the counter is incremented (i.e., "0<u>1</u>") to register the previous erroneous prediction. If a subsequent miss request results in the same counter being selected, the initial prediction will be for table size "0." If this prediction is correct, the lower order digit will be decremented (i.e., "0<u>0</u>") to reinforce the correct prediction and the state will return to state "A." If, however, the prediction is incorrect, the higher order digit will be incremented to "1" (i.e., "<u>1</u>0") and the state will transition to state "C" and the initial table size prediction will be table size "1" the next time the same counter is selected. If the subsequent prediction is correct, the lower order bit will be incremented to reinforce the correct prediction and the state will transition to state "D."

Using the technique described herein, errors will be minimized because the counter will lead to the correct result at least half the time rather than creating the possibility that each prediction will lead to the wrong value. In practice, however, the accuracy is substantially higher. In summary, the present invention uses hysterisis principles by relying on the high-order bit to predict the value of the table. The lower bit is used to register the fact that there was a missed prediction. The fact that there was a missed prediction is not necessarily used. Specifically, in the method and apparatus of the present invention, at least two mispredictions are required before a prediction will be changed.

As set forth above, a method and apparatus for improving translation look-aside buffer reload performance is described. For clarity, only those aspects of the chip multithreading (CMT) processor system germane to the invention are described, and product details well known in the art are omitted. For the same reason, the computer hardware is not described in further detail. It should thus be understood that the invention is not limited to any specific logic implementation, computer language, program, or computer. While various details are set forth in the following description, it will be appreciated that the present invention may be practiced without these specific details. For example, selected aspects are shown in block diagram form, rather than in detail, in order to avoid obscuring the present invention. Some portions of the detailed descriptions provided herein are presented in terms of algorithms or operations on data within a computer memory. Such descriptions and representations are used by those skilled in the field of microprocessor design to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that throughout the description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

While the present invention has been particularly described with reference to FIGS. 1-9 and with emphasis on certain memory structures, it should be understood that the figures are for illustration purposes only and should not be taken as limitations upon the present invention. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

The invention claimed is:

1. A single chip multithreaded processor comprising:
   a plurality of processor cores, wherein each core is configured to support processing of multiple threads by generating requests for data and instructions related to processing of said multiple threads and wherein said plurality of cores supports a plurality of virtual memory page sizes;
   a memory management unit configured to generate a plurality of miss requests related to the processing of data and instructions for said multiple threads, wherein each of said miss requests comprises a plurality of data parameters and wherein the plurality of data parameters comprises context information corresponding to a particular thread;
   priority logic configured to select a single miss request from said plurality of miss requests;
   hashing logic configured to receive and process said data parameters of said selected miss request and to generate a miss request index therefrom; and
   prediction array logic configured to process said miss request index thereby generating a predictor to be provided as an input to a prediction array to select a desired translation storage buffer, wherein said predictor corresponds to one of said plurality of virtual memory page sizes.

2. The single chip multithreaded processor of claim 1, wherein the plurality of processor cores comprises at least eight processor cores, where each core supports at least eight threatds.

3. The single chip multithreaded processor of claim 1, wherein said plurality of data parameters comprises partition identifier information corresponding to a particular thread and the single chip multithreaded processor is configured to generate the partition identifier information.

4. The single chip multithreaded processor of claim 1, wherein said plurality of data parameters comprises a virtual address and the single chip multithreaded processor is configured to generate the virtual address.

5. The single chip multithreaded processor of claim 1, wherein said hashing logic comprises a plurality of exclusive OR gates.

6. The single chip multithreaded processor of claim 5, wherein said hashing logic comprises 6 exclusive OR gates operable to generate a six-bit prediction index.

7. The single chip multithreaded processor of claim 1, wherein said prediction array logic comprises a plurality of two-bit saturating up-down counters.

8. The single chip multithreaded processor of claim 7, wherein the high-order bit of said two-bit saturating up-down counter is used for predicting the page size of said translation storage buffer.

9. The single chip multithreaded processor of claim 8, wherein the low-order bit of said two-bit saturating counter is used to reinforce the accuracy of the prediction of said page size of said translation storage buffer based on said high-order bit of said two-bit counter.

10. A method for predicting the page size of a translation storage buffer in a single chip multithreaded processor comprising:
   processing multiple threads in a plurality of processor cores by generating requests for instructions and data related to processing of said multiple threads, wherein said plurality of processing cores support a plurality of virtual memory page sizes;

a memory management unit generating a plurality of miss requests related to the processing of said instructions and data for said multiple threads, wherein each of said miss requests comprises a plurality of data parameters;

using priority logic to select a single miss request from said plurality of miss requests;

hashing said data parameters of said selected miss request to generate a miss request index therefrom, wherein said data parameters hashed to generate the miss request index comprise context information corresponding to a particular thread; and generating, by processing said miss request index, a predictor to be provided as an input to a predictor array for a desired translation storage buffer and selecting the predicted translation storage buffer, wherein said predictor corresponds to one of said plurality of virtual memory page sizes.

11. The method of claim 10, wherein the plurality of processor cores comprises at least eight cores, where each core supports at least eight threads.

12. The method of claim 10, wherein said plurality of data parameters hashed to generate a miss request index comprises partition identifier information corresponding to a particular thread and wherein the method comprises generating the partition identifier information.

13. The method of claim 10, wherein said plurality of data parameters hashed to generate a miss request index comprises a virtual address and wherein the method comprises generating the virtual address.

14. The method of claim 10, wherein said hashing function is executed in hashing logic comprising a plurality of exclusive OR gates.

15. The method of claim 14, wherein said hashing logic comprises 6 exclusive OR gates operable to generate a six-bit prediction index.

16. The method of claim 10, wherein said prediction array logic comprises a plurality of two-bit saturating up-down counters.

17. The method of claim 16, wherein the high-order bit of said two-bit saturating up-down counter is used for predicting the page size of said translation storage buffer.

18. The method of claim 17, wherein the low-order bit of said two-bit saturating counter is used to reinforce the accuracy of the prediction of said page size of said translation storage buffer based on said high-order bit of said two-bit counter.

19. The processor of claim 1, wherein the plurality of data parameters comprises:
a partition identifier corresponding to a particular thread; and
a virtual address.

20. The method of claim 10, wherein the plurality of data parameters comprises:
a partition identifier corresponding to a particular thread; and
a virtual address.

* * * * *

UNITED STATES PATENT AND TRADEMARK OFFICE
CERTIFICATE OF CORRECTION

PATENT NO.         : 7,543,132 B1
APPLICATION NO.    : 10/880985
DATED              : June 2, 2009
INVENTOR(S)        : Greg F. Grohoski et al.

Page 1 of 1

It is certified that error appears in the above-identified patent and that said Letters Patent is hereby corrected as shown below:

In Claim 2, Column 14 (line 32), please replace "threatds" with --threads--.

Signed and Sealed this

Eleventh Day of August, 2009

David J. Kappos
*Director of the United States Patent and Trademark Office*